United States Patent [19]

Giroud-Abel

[11] Patent Number: 4,612,339
[45] Date of Patent: Sep. 16, 1986

[54] HEAT STABILIZED POLYAMIDE COMPOSITIONS

[75] Inventor: Bruno Giroud-Abel, Ecully, France

[73] Assignee: Rhone-Poulenc Specialites Chimiques, Courbevoie, France

[21] Appl. No.: 709,793

[22] Filed: Mar. 8, 1985

[30] Foreign Application Priority Data

Mar. 8, 1984 [FR] France ............................. 84 03786

[51] Int. Cl.[4] .......................... C08K 3/16; C08K 5/13; C08K 5/11
[52] U.S. Cl. ...................................... 524/84; 252/397; 252/400.1; 252/400.2; 252/400.54; 524/99; 524/106; 524/111; 524/327; 524/357; 524/392; 524/402; 524/403; 524/401; 524/436
[58] Field of Search ............... 524/402, 403, 436, 401, 524/84, 99, 106, 111, 327, 357, 392

[56] References Cited

U.S. PATENT DOCUMENTS

| 3,108,091 | 10/1963 | Illing et al. | 524/403 |
| 3,228,898 | 1/1966 | Illing et al. | 524/606 |
| 3,468,843 | 9/1969 | Busse | 524/403 |
| 3,755,221 | 8/1973 | Hitch | 524/606 |
| 4,237,034 | 12/1980 | Tomka et al. | 524/394 |
| 4,397,979 | 8/1983 | Reimschuessel | 524/606 |
| 4,399,064 | 8/1983 | Penneck | 524/403 |

FOREIGN PATENT DOCUMENTS

| 8729 | 3/1980 | European Pat. Off. . |
| 5350 | 9/1954 | German Democratic Rep. . |

*Primary Examiner*—Veronica P. Hoke
*Attorney, Agent, or Firm*—Burns, Doane, Swecker & Mathis

[57] ABSTRACT

The polyamide polymers, notably the nylons, are effectively heat stabilized, characteristically with good retention of mechanical properties, by formulating therewith stabilizing amounts of (i) at least one lanthanide or yttrium-based compound and (ii) at least one ammonium, or alkali or alkaline earth metal halide.

17 Claims, No Drawings

HEAT STABILIZED POLYAMIDE COMPOSITIONS

BACKGROUND OF THE INVENTION

1. Field of the Invention

The present invention relates to the stabilization of polyamides, particularly against the heat degradation thereof, to the stabilizing additives utilized therefor and to the stabilized polymeric compositions thus produced.

The polyamides to be stabilized consistent herewith include, in particular: the polyamides prepared by polycondensation of saturated aliphatic dicarboxylic acids containing from 6 to 12 carbon atoms with saturated aliphatic di-primary diamines containing from 6 to 12 carbon atoms; the polyaminoacids prepared either by direct homopolycondensation of ω-aminoalkanoic acids containing one hydrocarbon chain containing from 4 to 12 carbon atoms, or by hydrolytic ring opening and polymerization of the lactams derived from these acids; the copolyamides prepared from the starting material monomers and comonomers of the aforesaid polyamides; and mixtures of the aforesaid or like polyamides.

Exemplary of the polyamides prepared by polycondensation of diacids and diamines, representative are, for example: nylon 66 (polymer of hexamethylenediamine and adipic acid), nylon 69 (polymer of hexamethylenediamine and azelaic acid), nylon 610 (polymer of hexamethylenediamine and sebacic acid), and nylon 612 (polymer of hexamethylenediamine and dodecanedioic acid).

Exemplary of the polyaminoacids intended, representative are: nylon 4 (polymer of 4-aminobutanoic acid or of δ-butyrolactam), nylon 5 (polymer of 5-aminopentanoic acid or of δ-valerolactam), nylon 6 (polymer of ε-caprolactam), nylon 8 (polymer of 7-aminoheptanoic acid), nylon 8 (polymer of caprylolactam), nylon 9 (polymer of 9-aminononanoic acid), nylon 10 (polymer of 10-aminodecanoic acid), nylon 11 (polymer of 11-aminoundecanoic acid), and nylon 12 (polymer of 12-aminododecanoic acid or of laurolactam).

Exemplary of the copolyamides intended, representative are, for example: nylon 66/610 (copolymer of hexamethylenediamine, adipic acid and sebacic acid), and nylon 66/6 (copolymer of hexamethylenediamine, adipic acid and caprolactam).

Those polyamides preferably and well adopted to be stabilized in accordance herewith include: nylon 66, nylon 610, nylon 6, nylon 66/610 and nylon 66/6.

2. Description of the Prior Art

The polyamides, particularly the individual nylons noted hereinabove, are of course basic materials in the plastics conversion industry. In the course of their conversion, the polyamides are typically exposed to temperatures on the order of 150° C. to 300° C. during their mixing and forming operations. And in use, the articles shaped therefrom are typically subjected for a fairly lengthy period of time to service temperatures on the order of 100° C. to 150° C. It too is known that when polyamides are subjected to the action of heat, a number of irreversible chemical and physical changes occur, the extent of which can vary as a function of the processing atmosphere (inert, oxidizing), of the processing temperature, of the duration of the process and of the state of the polymer (liquid, solid) which, in practice, manifest themselves through the appearance of the following disadvantages: the polymers become brittle, they become colored or discolored in a manner which is unacceptable for a number of applications and, in addition, their mechanical properties decline, particularly as regards tensile properties and resilience values. And it is precisely for this reason that heat stabilizers are conventionally added to polymers to prevent their degradation, or at least to reduce it considerably.

Many stabilizing systems have been proposed to this art to overcome the above-mentioned disadvantages. Many of these stabilizers give good results and are indeed in general use. Such is the case, particularly, of cuprous or cupric halides, whether used alone or in admixture with alkali metal halides; a stabilizer of this type which is particularly suitable consists of mixtures of CuI and KI.

Other types of known stabilizers consist of: aromatic hydroxy compounds such as, for example, 2,6-ditertbutyl-p-cresol, aromatic amines such as, for example, N,N'-diphenyl-p-phenylenediamine, and organic phosphorus compounds such as, for example, triphenyl phosphite.

For general outline of stabilizing systems for polyamides, reference is made, for example, to *Encyclopedia of Chemical Technology*, Vol. 18, pages 334 to 337 (1982) and *Encyclopedia of Polymer Science and Technology*, Vol. 10, page 464 (1969).

Nonetheless, despite all of the interest in the known stabilizers, research continues in this field because, depending upon the end applications for which the polyamides are intended, one stabilizing system or another always presents greater or lesser disadvantages. Thus, it is of the utmost importance that formulators have a wide variety of stabilizing systems at their disposal, from which they will be able to select those compounds which have the greatest number of technical or economic advantages for any particular application.

SUMMARY OF THE INVENTION

Accordingly, a major object of the present invention is the provision of an improved class of stabilizing additives for the polyamides, said improved stabilizers comprising an effective amount of at least one lanthanide-based compound and at least one ammonium, or alkali or alkaline earth metal halide.

As utilized herein, by the term "lanthanide" there is intended the metals in the Periodic Table of elements having atomic numbers from 57 to 71, and yttrium, which has similar properties although it has an atomic number of 39.

By the expression "lanthanide-based compound", there is intended:

(1) an organic or inorganic derivative of any one of the lanthanides: cerium, lanthanum, praseodymium, neodymium, promethium, samarium, europium, gadolinium, terbium, dysprosium, holmium, erbium, ytterbium, thulium, lutetium, and yttrium; thus, the expression "at least one lanthanide-based compound" connotes that either a single derivative or compound, of a mixture of organic derivatives, or a mixture of inorganic derivatives, or a mixture of organic and inorganic derivatives of any one of the above-mentioned lanthanides may be used; and (2) a mixture of organic and/or inorganic derivatives of a plurality of such lanthanides; thus, the expression "at least one lanthanide-based compound" connotes that it is envisaged to use, besides a single mixture, a combination of several mixtures of this type.

DETAILED DESCRIPTION OF THE INVENTION

More particularly according to the present invention, and notably because of the relative amounts of the various lanthanide compounds in the most common ores, particularly in monazite and bastnaesite, when a single lanthanide derivative or compound is used consistent herewith, the same is preferably cerium, lanthanum, praseodymium or neodymium. Among such metals, cerium and lanthanum are the most abundant and are particularly suitable for application according to this invention.

Mixtures of derivatives of more than one lanthanide may also be employed. It may even be advantageous to dispense with carrying out the lengthy and costly separation of all of the lanthanides present in relatively low concentrations in the ores which are generally processed. Such instances typically characteristically mandate the use of the following mixtures:

(i) a mixture of derivatives or compounds of cerium and of one or more other lanthanides;

(ii) a mixture of derivatives or compounds of lanthanum and of one or more other lanthanides selected from among praseodymium, neodymium, promethium, samarium, europium, gadolinium, terbium, dysprosium, holmium, erbium, ytterbium, thulium, lutetium, and yttrium;

(iii) a mixture of derivatives or compounds of praseodymium and of one or more other lanthanides selected from among neodymium, promethium, samarium, europium, gadolinium, terbium, dysprosium, holmium, erbium, ytterbium, thulium, lutetium, and yttrium; and (iv) a mixture of derivatives or compounds of neodymium and of one or more other lanthanides selected from among promethium, samarium, europium, gadolinium, terbium, dysprosium, holmium, erbium, ytterbium, thulium, lutetium, and yttrium.

When such mixtures of a plurality of lanthanide compounds are used according to the invention, cerium and/or lanthanum and/or praseodymium and/or neodymium advantageously constitute at least 40 mole % of the total amount of the lanthanides.

An "organic derivative of a lanthanide" is intended to connote, more particularly, the salts of various carboxylic acids, metal derivatives of phenolic compounds, mercaptides and chelates of β-dicarbonyl compounds.

Still more particularly, the organic derivatives of a lanthanide are advantageously selected from among:

(1) the lanthanide salts:

(i) of aliphatic monocarboxylic acids containing from 2 to 30 carbon atoms, or aliphatic dicarboxylic acids containing from 3 to 30 carbon atoms, saturated or containing one or more ethylenic double bonds, and optionally having one or more substituents such as halogen atoms, hydroxy groups, alkoxy groups containing from 1 to 12 carbon atoms, mercapto groups, phenyl, phenoxy, naphthyl or cyclohexyl groups, the ring moieties of which are themselves optionally substituted by one or more halogen atoms, hydroxy groups, alkyl groups containing 1 to 6 carbon atoms, or alkoxy groups containing 1 to 6 carbon atoms;

(ii) of benzoic, 1-naphthoic, 2-naphthoic, cyclopentanecarboxylic, cyclohexanecarboxylic, cyclopentenecarboxylic or cyclohexenecarboxylic acids, the cyclic moieties of which acids optionally having one or more substituents such as halogen atoms, hydroxy groups, alkyl groups containing 1 to 12 carbon atoms, alkenyl groups containing 2 to 12 carbon atoms, alkoxy groups containing 1 to 12 carbon atoms, phenyl, benzyl, phenoxy or cyclohexyl groups, alkoxycarbonyl groups containing 2 to 24 carbon atoms, or alkenyloxycarbonyl groups containing 4 to 24 carbon atoms;

(iii) of alkyl monoesters (the alkyl group containing 1 to 24 carbon atoms) or alkenyl monoesters (the alkenyl group containing 3 to 24 carbon atoms) of the aliphatic dicarboxylic acids mentioned above;

(iv) of heterocyclic carboxylic acids, particularly of those derived from pyridine, furan, thiophene, pyrrole and pyran, optionally having one or more substituents such as halogen atoms, hydroxy groups, alkyl groups containing 1 to 12 carbon atoms, alkoxy groups containing 1 to 12 carbon atoms, alkenyl groups containing 2 to 12 carbon atoms, alkoxycarbonyl groups containing 2 to 24 carbon atoms, or alkenyloxycarbonyl groups containing 4 to 24 carbon atoms;

(2) lanthanide phenolates derived from phenol, 1-naphthol or 2-naphthol, the cyclic moieties of whcih may have one or more substituents such as halogen atoms, alkyl or alkoxy groups containing 1 to 24 carbon atoms, alkenyl groups containing 2 to 24 carbon atoms, phenyl, benzyl, phenoxy or cyclohexyl groups;

(3) lanthanide mercaptides, particularly those derived from thioglycolic and thiomalic acids and from their alkyl esters (the alkyl radical containing 1 to 12 carbon atoms), alkenyl esters (the alkenyl radical containing 2 to 12 carbon atoms), phenyl, benzyl, cyclohexyl, alkanediol (containing from 2 to 12 carbon atoms), dihydroxybenzene and dihydroxycyclohexane esters, the cyclic moieties of these esters optionally being substituted by one or more alkyl or alkoxy radicals containing from 1 to 6 carbon atoms;

(4) lanthanide chelates of β-dicarbonyl compounds, particularly those derived from the compounds of the general formula (I):

$$R_1-CO-CHR_2-CO-R_3$$

in which $R_1$ and $R_3$, which are identical or different, are each a straight or branched chain alkyl group containing 1 to 36 carbon atoms, optionally substituted by one or more halogen atoms; a straight or branched chain alkenyl group containing 3 to 36 carbon atoms, optionally substituted by one or more halogen atoms; an aryl radical or an aryl radical bearing on the aromatic ring one or more of such substituents as (a) alkyl radicals containing 1 to 6 carbon atoms, optionally substituted by one or more halogen atoms, (b) alkenyl radicals containing 2 to 6 carbon atoms, optionally substituted by one or more halogen atoms, (c) the nitro group, (d) the —CHO group, (e) the —COOH group, (f) alkoxy groups containing 1 to 6 carbon atoms, (g) —COOR$_4$ groups, wherein R$_4$ is an alkyl radical containing 1 to 12 carbon atoms, or an alkenyl radical containing 2 to 12 carbon atoms, (h) the OH group, and (i) halogen atoms; an aralkyl radical, the aliphatic moiety of which contains from 1 to 12 carbon atoms and the cyclic moiety of which may bear one or more of the substituents noted hereinabove; a cycloaliphatic radical containing from 5 to 12 carbon atoms and the cyclic moiety of which may contain one or more carbon-carbon double bonds and also have one or more of the substituents noted hereinabove; a concatenation of a plurality of the radicals referred to hereinabove; with the proviso that the various aliphatic radicals defined hereinabove may contain one or more bridging —O— oxygen atoms, or —S— sulfur atoms, or —CO— carbonyl groups, or —COO— carboxylate groups; and $R_2$ denotes a hydrogen atom.

Among the organic lanthanide derivatives which are useful for stabilization according to the invention, advantageously selected, particularly for practical reasons or for such economic reasons as availability or price, are:

(1') the lanthanide salts:

(i) of aliphatic monocarboxylic acids containing from 6 to 24 carbon atoms, saturated or containing an ethylenic double bond and optionally having one or more substituents such as chlorine atoms, hydroxy groups, alkoxy groups containing from 1 to 6 carbon atoms, phenyl, phenoxy or cyclohexyl groups, these cyclic groups being optionally substituted by one or more chlorine atoms, hydroxy groups, or alkyl or alkoxy groups containing 1 to 6 carbon atoms;

(ii) of mercaptomonocarboxylic acids containing from 2 to 6 carbon atoms or mercaptodicarboxylic acids containing from 3 to 6 carbon atoms;

(iii) of benzoic or cyclohexanecarboxylic acids, the cyclic moiety of which may contain one or more substituents such as chlorine atoms, hydroxy groups, alkyl or alkoxy groups containing 1 to 6 carbon atoms or alkoxycarbonyl groups containing 2 to 12 carbon atoms;

(iv) of alkyl monoesters (the alkyl group containing 1 to 12 carbon atoms) of aliphatic dicarboxylic acids containing 4 to 24 carbon atoms, saturated or containing an ethylenic double bond, and optionally having one or more substituents such as chlorine atoms, hydroxy groups, mercapto groups or alkoxy groups containing 1 to 6 carbon atoms;

(2') lanthanide phenolates derived from phenol, the ring moiety of which may contain one or more substituents such as chlorine atoms, alkyl or alkoxy groups containing 1 to 12 carbon atoms, or phenyl, benzyl, phenoxy or cyclohexyl groups.

Exemplary of the organic derivatives of the lanthanides, representative are:

(1) lanthanide salts, particularly of cerium, lanthanum, praseodymium and neodymium, of propionic, hexanoic, n-octanoic, 2-ethylhexanoic, isooctanoic, nonanoic, decanoic, lauric, stearic, oleic, ricinoleic, margaric, tetradecanoic, 12-hydroxystearic, docosanoic, 13-docosenoic (erucic), 2-chlorodecanoic, 2-octyldecanoic, 2-hydroxyhexanoic, thioglycolic, mercaptopropionic, thiomalic, 6-cyclohexylhexanoic, benzoic, phenylacetic, 2-phenylpropanoic, 2-methylbenzoic, 4-methylbenzoic, 2-phenoxybenzoic, 4-propylbenzoic, 4-methoxybenzoic, 4-tert-butylbenzoic, salicylic, 5-tert-butylsalicylic, 4-hydroxy-3-methoxybenzoic, 3,4-dimethoxybenzoic, 1-naphthoic, 2-naphthoic, cyclohexanecarboxylic, nicotinic, isonicotinic, and 4-methylfuran-3-carboxylic acids, of monoisooctyl maleate, of mono(2-ethoxyethyl)maleate, of monobutyl phthalate, of monobutyl thiomalate and of monohexyl thiomalate;

(2) lanthanide phenolates particularly of cerium, lanthanum, praseodymium and neodymium, of phenol, cresols, ethylphenols, xylenols, butylphenols, isopentylphenols, isooctylphenols, tert-nonylphenols, decylphenols, dodecylphenols, tert-octylphenols, 4-cyclohexylphenol, 4-phenylphenol, ditert-nonylphenols, and methylisohexylphenols;

(3) lanthanide chelates, particlarly of cerium, lanthanum, praseodymium and neodymium, of the following β-diketones: 2,4-heptanedione, 2,4-decanedione, 2-methyl-2-decene-6,8-dione, 2-methyl-2-nonene-6,8-dione, stearoylacetone; 1-stearoyl-2-octanone, ethyl 7,9-dioxodecanoate, benzoylacetone, acetylacetone, 1-benzoyl-2-octanone, 1,4-diphenyl-1,3-butanedione, stearoylacetophenone, palmitoylacetophenone, 1-benzoyl-4-methylpentanone, benzoyloctacosanoylmethane, p-methoxybenzoylstearoylmethane, and dibenzoylmethane; and (4) lanthanide mercaptides, particularly of cerium, lanthanum, praseodymium and neodymium, of thioglycolic acid, isooctyl thioglycolate, octadecyl thioglycolate, benzyl thioglycolate, lauryl thioglycolate, 1,4-cyclohexanediol dithioglycolate, 4-tert-butylcyclohexyl thioglycolate, thiomalic acid, hexyl thiomalate, 2-ethylhexyl thiomalate, dodecyl thiomalate, benzyl thiomalate, cyclohexyl thiomalate, 1,3-propanediol thiomalate, 1,4-butanediol thiomalate and 1,6-hexanediol thiomalate.

The organic derivatives of lanthanides, which are not available directly, are prepared by conventional methods, such as the reaction of a carboxylic acid or anhydride thereof, of a phenolic compound, of a mercaptocarboxylic acid (or ester thereof) or of a β-diketone with an oxide or a hydroxide of a lanthanide, or, depending upon the circumstances, with a mixture of such oxides or hydroxides, in a suitable solvent medium and with application of heat if necessary.

By "inorganic derivative of a lanthanide" are intended, more particularly, the oxides, hydroxides, the salts of inorganic hydrogen acids, and the salts of inorganic oxygen acids.

Preferably used, for example, as lanthanide salts of inorganic hydrogen acids are: the chloride, bromide, iodide, sulfide, selenide and telluride; as lanthanide salts of inorganic oxygen acids: the sulfite, sulfate, sulfonate, nitrite, nitrate, phosphite, phosphate, pyrophosphate, carbonate, perchlorate, antimonate, arsenate, selenite, selenate, vanadate and tungstate.

Among the inorganic lanthanide derivatives which are useful in the stabilization according to the invention, advantageously selected, particularly for practical reasons or for such economic reasons as availability or price, are the lanthanide oxides, chlorides, sulfates or nitrates.

In the lanthanide derivatives according to the invention, the lanthanide may be present in various of its oxidation states; most typically it is present in the III or IV oxidation states.

With respect to the ammonium, or alkali or alkaline earth metal halide which is incorporated conjointly with the lanthanide-based compound, a chloride, a bromide or an iodide is typically employed. Other than the $NH_4^+$ ion, the cation is advantageously a cation derived from sodium, potassium, magnesium, calcium, strontium or barium.

According to a very preferred embodiment of the invention, the stabilizer system comprises effective amounts of:

(1) at least one of the lanthanide-based compounds, lanthanum(III) stearate, lanthanum(III) oxide, lanthanum(III) chloride, cerium(III) stearate, cerium(IV) oxide, and cerium(III) chloride; and (2) at least one of the ammonium, alkali or alkaline earth metal halides, the ammonium, sodium or potassium chloride, bromide or iodide.

The amount of lanthanide-based compound(s) employed may vary over very wide limits depending upon the degree of stabilization desired and depending upon the various additives which may optionally be incorported into the polymer.

More particularly, this amount is determined such that the lanthanide-based compound contributes from $0.1 \times 10^{-4}$ to $10 \times 10^{-4}$ gram-atoms of lanthanide group metal per 100 g of polyamide. Preferably, this amount is determined such as to contribute from $1 \times 10^{-4}$ to $5 \times 10^{-4}$ gram-atoms of the lanthanide group metal per 100 g of polyamide.

The amount of ammonium, or alkali or alkaline earth metal halide(s) utilized according to the invention may also vary widely.

More particularly, this amount is determined such that the ratio $$\frac{\text{total number of gram-atoms of halogen}}{\text{number of gram-atoms of lanthanide group metal}}$$

varies from 1 to 20 and, preferably, from 5 to 10.

By the expression "total number of gram-atoms of halogen" there is intended the number of gram-atoms of halogen constituting the ammonium, or alkali or alkaline earth metal halide employed, to which is added, if appropriate, the number of gram-atoms of halogen constituting, where applicable, from the lanthanide-based compound employed.

The lanthanide-based compound(s) and the ammonium, or alkali or alkaline earth metal halide(s), may be incorporated in the polymer at the same time as one or more of such other conventional additives as, in particular, fillers, impact strength improvers, lubricants, plasticizers, pigments, wetting agents, antistatic agents and nucleating agents.

The lanthanide-based compound(s) and the ammonium, or alkali or alkaline earth metal halide(s), may also be premixed with each other to form stabilizing compositions. Such stabilizing compositions circumscribe another embodiment of the invention.

Usually, the incorporation of either the separate components of the stabilizing compositions or of the preformed stabilizing compositions themselves (incorporation which is carried out, if appropriate, at the same time as that of all or a portion of the various additives mentioned above) in the polamide is carried out using the usual known methods for formulating a homogeneous admixture of the various ingredients. Preferably, the admixture of the various components is produced in the form of a powder or of granules by first constituting, cold, a premix in a conventional mixer, and then homogenizing the enitre mass by hot kneading in an extruder equipped with one or more screws. When this process is complete, rods are obtained which are cooled in water and then cut into granules, the latter then being dried, if appropriate. The stabilized polymer compositions obtained may thus be used by the converter in the form of granulates.

The stabilized polyamide compositions according to the invention may be used for forming the desired shaped articles by conventional injection molding or extrusion.

Polyamides stabilized with the system of lanthanide-based compound(s)+ammonium, alkali or alkaline earth metal halide(s) have a heat stability which is comparable to that obtained using the best system of the prior art, namely, that based on CuI+KI.

Furthermore, it has also been found that the use of lanthanide-based compound(s) makes it possible to control and to efficiently restrict the change in the molecular characteristics of the polyamide during injection molding or extrusion. This change is more or less pronounced depending upon the end group balance of the polyamide, the residual moisture content, the temperature of the melt during the conversion, the conversion period, the identity and the concentration of the additives present, and it entails a change in the rheological characteristics of the polymer which may be undesirable for the production of a flexible and uniform molding and for obtaining articles having a proper appearance and optimum quality. The shaped articles prepared from the polyamides stabilized according to the invention have, in fact, a surface appearance of optimum quality which is a particular manifestation of the lanthanide-based compounds.

As further regards the subject of the additives which may be concurrently employed, mention has been made earlier, in particular, of fillers and impact strength improvers.

Where fillers are concerned, the products which are generally suitable consist of glass fibers, asbestos fibers, ballotini, kaolin, tin, silica, mica, bentonites, bentones, or mixtures of these materials. These fillers may be employed as such, or after having been subjected to a surface treatment to enhance compatibility and/or adhesion to the polyamide matrix. The surface treatment agent, such as, for example, aminosilane compounds, may also be added at the time of homogenization of the polyamide with the various ingredients employed. Among such fillers, those employed most widely are glass fibers. These fibers generally have a mean diameter of from 1 to 15 $\mu$m and a length of from 2 to 8 mm. To obtain articles endowed with optimum mechanical properties it is advantageous to employ fibers sized, for example, with epoxy, polyester, polyurethane or vinyl polymer resins. The proportions of fillers may vary from, for example, 20 to 50% by weight relative to the weight of the polyamide matrix.

Where the impact strength enhancers are concerned, particularly at temperatures as low as those from 0° to $-40°$ C., the products which are notably suitable are copolymers derived from at least one olefin and at least one other monomer copolymerizable therewith and containing carboxy and/or carboxylate groups.

More especially in this regard, exemplary polymers are (a) olefin copolymers derived from an aliphatic $\alpha$-olefin containing from 2 to 6 carbon atoms (for example, ethylene, propylene, 1-butene, 1-pentene, 1-hexene) and at least one $\alpha,\beta$-unsaturated mono- or dicarboxylic acid containing from 3 to 8 carbon atoms (for example, acrylic acid, methacrylic acid, maleic acid, fumaric acid, itaconic acid, or vinylbenzoic acid), the lower alkyl esters and the anhydrides of such acids; copolymers which are suitable are, for example: ethylene-acrylic acid, ethylene-methacrylic acid, ethylene-acrylic acid-methyl methacrylic copolymers; (b) olefin copolymers containing carboxy and/or carboxylate groups and derived from ethylene and from at least one $\alpha$-olefin containing from 3 to 6 carbon atoms. As the $\alpha$-olefin containing from 3 to 6 carbon atoms, preferred is propylene, although another $\alpha$-olefin of this type, particularly 1-butene, 1-pentene and 1-hexene, may be selected instead of or in addition to propylene. The introduction of the carboxy and/or carboxylate groups may be carried out either by direct copolymerization of the mixture of ethylene with an $\alpha$-olefin containing from 3 to 6 carbon atoms with at least one unsaturated $\alpha,\beta$-unsaturated dicarboxylic acid containing from 4 to 8 carbon atoms (maleic acid, fumaric acid, itaconic acid), the lower alkyl esters and the anhydrides thereof, or by grafting the acid compound(s) (acid and/or derivative) onto the olefin base, induced by ionization, by hydroperoxidation or under the effects of heat and pressure. Suitable copolymers are, for example: ethylene-propylene copolymers grafted with maleic anhydride, and ethylene-propylene copolymers grafted with fumaric acid.

Also exemplary are (c) copolymers containing carboxy and/or carboxylate groups and derived from ethylene, at least one α-olefin containing from 3 to 6 carbon atoms and at least one unconjugated diene. Here again, propylene is preferably the α-olefin containing from 3 to 6 carbon atoms. The unconjugated diene advantageously is an aliphatic diene containing at least 6 carbon atoms and having a terminal double bond and an internal double bond; 1,4-hexadiene is preferred in this case. The introduction of the carboxy and/or carboxylate groups is carried out by treating the ethylene-α-olefin-diene mixture as mentioned either in the case of the ethylene-α-olefin mixture. Suitable copolymers are, for example: ethylene-propylene-1,4-hexadiene copolymers grafted with maleic anhydride and ethylene-propylene-1,4-hexadiene copolymers grafted with fumaric acid.

The amounts of functionally modified copolymers to be optionally employed advantageously constitute 2% to 60% by weight of the polyamide matrix.

In order to further illustrate the present invention and the advantages thereof, the following specific examples are given, it being understood that same are intended only as illustrative and in nowise limitative.

EXAMPLES 1 TO 3 AND COMPARATIVE TESTS A TO E

1. Description of These Examples and Tests (i) Control Test A: a composition was prepared from: 100 parts by weight of nylon 66+0.1 part by weight of Cemulsol J+0.25 part by weight of ester-wax. The nylon 66 (a polymer of hexamethylene diamine and adipic acid) employed is marketed by RHONE-POULENC SPECIALITES CHIMIQUES under the trademark TECHNYL A 200 and had a viscosity number of 138 ml/g (determined, according to ISO Standard R 307, 1977 edition, on the portion soluble in formic acid of 90% weight strength). Cemulsol J is a wetting agent marketed by SFOS. The ester-wax was a lubricating agent marketed by LA CERISINE under the trademark LACER V8/D; this product had a melting point of 69° to 72° C. and was prepared from behenic acid and/or montanic acid.

(ii) Examples 1 to 3 and Comparative Tests B to E: the various stabilizers noted in Table I which follows were added to the composition of Test A above. The amounts of the stabilizers are given in parts by weight of dry pure product; the amounts employed were determined such that:

(a) the number of gram-atoms of lanthanide group metal (or of copper in Test C) which were present per 100 g of polyamide was approximately $3.41 \times 10^{-4}$;

(b) when used in combination with an alkali metal halide, the ratio of the total number of gram-atoms of halogen to the total number of gram-atoms of lanthanide group metal (or of copper in Test C) was constant and equal to approximately 7.1.

TABLE I

| Stabilizers | A | 1 | B | C | 2 | D | 3 | E |
|---|---|---|---|---|---|---|---|---|
| Lanthanum(III) stearate La($C_{17}H_{35}COO$)$_3$ | 0 | 0.337 | 0.337 | 0 | 0 | 0 | 0 | 0 |
| Cerium(III) stearate Ce($C_{17}H_{35}COO$)$_3$ | 0 | 0 | 0 | 0 | 0.338 | 0.338 | 0 | 0 |
| Cerium(III) chloride $CeCl_3$ | 0 | 0 | 0 | 0 | 0 | 0 | 0.084 | 0.084 |
| Copper iodide CuI | 0 | 0 | 0 | 0.065 | 0 | 0 | 0 | 0 |
| Potassium iodide KI | 0 | 0.404 | 0 | 0.350 | 0.404 | 0 | 0.234 | 0 |

2. General Operating Procedure and Monitoring Carried Out

The compositions were prepared as follows:

Using a MORITZ mixer, nylon 66 granules were first wetted with Cemulsol J, and then the ester-wax and the various stabilizers of each composition were added, and the dry premixing was completed in the MORITZ mixer. This premix was then kneaded, in the melt state, in a TROESTER vacuum extruder fitted with a screw of diameter D equal to 45 mm and 28D in length; the screw was a cylindro-conical screw with a special profile for processing polyamides; the extruder was also fitted with a die having a 3.5 mm diameter orifice; the extrusion conditions are as follows:

(i) Temperatures: entry: 255° C.; middle: 290° C.; die: 260° C.;
(ii) Vacuum: $931 \times 12^2$ Pa;
(iii) Screw speed: 90 rev/min;
(iv) Throughput of material: from 9 to 11 kg/hour.

The product, obtained in the form of rods, was cooled by passing same through a cold water bath and it was then granulated and dried.

From the molding powder thus obtained, dumbbell-shaped specimens were prepared, having a thickness of 1 mm, a width of 4 mm and a calibrated length (the length over which the measurements were carried out) of 50 mm. Molding of the specimens was carried out using a DK type 60 screw press. In this press, the granules of the molding powder were melted at a temperature of 280° C. while the mold was maintained at a temperature of 80° C.; the injection compound pressure was 70 Mpa; the injection cycle time was 22 seconds.

The tensile properties (yield stress and elongation at break) of these molded specimens were then measured in an INSTRON tensometer, the measurement temperature being 23° C., the pull speed being 50 mm/min; the initial properties were measured at zero percent relative humidity using raw molded specimens and these same properties were measured after a period of 240 hours at 120° C. in a ventilated air oven.

3. Results of Examples 1 to 3 and of Tests A to E

The results obtained are reported in Table II which follows:

TABLE II

| Example/ Test | Yield stress in Mpa | | Elongation at break in % of the initial length | |
|---|---|---|---|---|
| | Initial | After 240 h at 120° C. | Initial | After 240 h at 120° C. |
| Test A | 78 | 44 | 175 | 3 |
| Example 1 | 81 | 81 | 96 | 20 |
| Test B | 80 | 18(B) | 86 | 1 |
| Test C | 83 | 81 | 105 | 43 |
| Example 2 | 84 | 79 | 71 | 12 |
| Test D | 80 | 16(B) | 101 | 0.8 |
| Example 3 | 80 | 80 | 96 | 13.5 |
| Test E | 81 | 20(B) | 61 | 1.3 |

In Table II, the symbol (B) connotes that the specimens have broken; the break stress was then measured immediately under these conditions. In this Table, in the section referring to elongation at break, a considerable difference can be seen between the initial value corresponding to the control composition (Test A) and the (lower) initial values corresponding to the other compositions; this difference is explained as follows: in Examples 1 to 3 and Tests B to E a nucleation effect due to the addition of the stabilizers was involved; the degree of crystallization and crystal morphology were consequently modified and this results in the observed reduction in the initial elongation at break (which phenomenon is well known to those skilled in this art).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising a polyamide matrix, said matrix having incorporated therein (i) at least one lanthanide or yttrium-based compound other than halides and (ii) at least one ammonium, or alkali or alkaline earth metal halide, in an amount effective to stabilize said polyamide matrix against action by light and heat and against a change in rheological characteristics.

2. The composition of matter as defined by claim 1, said lanthanide or yttrium-based compound comprising an organic or inorganic compound of cerium, lanthanum, praseodymium, neodymium, promethium, samarium, europium, gadolinium, terbium, dysprosium, holmium, erbium, ytterbium, thulium, lutetium, or yttrium, or admixture thereof.

3. The composition of matter as defined by claim 2, wherein said lanthanide-based compound is a compound of cerium, lanthanum, praseodymium or neodymium.

4. The composition of matter as defined by claim 2 said lanthanide or yttrium-based compound comprising admixture of cerium and one or more other lanthanides or yttrium, admixture of lanthanum compound and one or more praseodymium, neodymium, promethium, samarium, europium, gadolinium, terbium, dysprosium, holmium, erbium, ytterbium, thulium, lutetium, or yttrium compound, admixture of praseodymium compound and one or more neodymium, promethium, samarium, europium, gadolinium, terbium, dysprosium, holmium, erbium, ytterbium, thulium, lutetium or yttrium compound, or admixture of neodymium compound and one or more promethium, samarium, europium, gadolinium, terbium, dysprosium, holmium, erbium, ytterbium, thulium, lutetium or yttrium compound.

5. The composition of matter as defined by claim 4, wherein the cerium and/or lanthanum and/or praseodymium and/or neodymium comprise at least 40 mole % of the total amount of lanthanides and yttrium.

6. The composition of matter as defined by claim 1 said lanthanide or yttrium-based compound comprising (1) a lanthanide or yttrium salt of (i) an aliphatic monocarboxylic acid containing from 2 to 30 carbon atoms or an aliphatic dicarboxylic acid containing from 3 to 30 carbon atoms, either saturated or containing one or more ethylenic double bonds, or a substituted such acid substituted by one or more halogen atoms, hydroxy groups, alkoxy groups containing from 1 to 12 carbon atoms, mercapto groups, phenyl, phenoxy, naphthyl, or cyclohexyl groups, the ring moieties of which optionally being substituted by one or more halogen atoms, hydroxy groups, alkyl groups containing 1 to 6 carbon atoms, or alkoxy groups containing 1 to 6 carbon atoms; (ii) benzoic, 1-naphthoic, 2-naphthoic, cyclopentanecarboxylic, cyclohexanecarboxylic, cyclopentenecarboxylic or cyclohexenecarboxylic acid, the cyclic moieties of which optionally being substituted by one or more halogen atoms, hydroxy groups, alkyl groups containing 1 to 12 carbon atoms, alkenyl groups containing 2 to 12 carbon atoms, alkoxy groups containing 1 to 12 carbon atoms, phenyl, benzyl, phenoxy or cyclohexyl groups, alkoxy-carbonyl groups containing 2 to 24 carbon atoms, or alkenyloxy-carbonyl groups containing 4 to 24 carbon atoms; (iii) an alkyl monoester, the alkyl moiety of which containing 1 to 24 carbon atoms, or alkenyl monoester, the alkenyl moiety of which containing 3 to 24 carbon atoms, of the aliphatic dicarboxylic acids defined above; (iv) a heterocyclic carboxylic acid, or a substituted such acid substituted by one or more halogen atoms, hydroxy groups, alkyl groups containing 1 to 12 carbon atoms, alkoxy groups containing 1 to 12 carbon atoms, alkenyl groups containing 2 to 12 carbon atoms, alkoxycarboxyl groups containing 2 to 24 carbon atoms, or alkenyloxycarbonyl groups containing 4 to 24 carbon atoms; (2) a lanthanide or yttrium phenolate, the cyclic moiety of which optionally being substituted by one or more halogen atoms, alkyl or alkoxy groups containing 1 to 24 carbon atoms, alkenyl groups containing 2 to 24 carbon atoms, phenyl, benzyl, phenoxy or cyclohexyl groups; (3) a lanthanide or yttrium mercaptide; or (4) a lanthanide or yttrium chelate of a β-dicarbonyl compound having the general formula (I):

$$R_1-CO-CHR_2-CO-R_3 \quad (I)$$

in which $R_1$ and $R_3$, which are identical or different, are each a straight or branched chain alkyl group containing 1 to 36 carbon atoms, or such alkyl group substituted by one or more halogen atoms; a straight or branched chain alkenyl group containing 3 to 36 carbon atoms, or such alkenyl group substituted by one or more halogen atoms; an aryl radical or an aryl radical substituted aromatically by one or more of the following substituents: (a) alkyl radicals containing 1 to 6 carbon atoms, or such radicals substituted by one or more halogen atoms, (b) alkenyl radicals containing 2 to 6 carbon atoms, or such radicals substituted by one or more halogen atoms, (c) the nitro group, (d) the —CHO group, (e) the —COOH group, (f) alkoxy groups containing 1 to 6 carbon atoms, (g) a —COOR$_4$ group, wherein R$_4$ is an alkyl radical containing 1 to 12 carbon atoms or an alkenyl radical containing 2 to 12 carbon atoms, (h) the OH group, or (i) halogen atoms; an aralkyl radical, the aliphatic moiety of which contains from 1 to 12 carbon atoms and the cyclic moiety of which may be substituted by one or more of the above substituents; a cycloaliphatic radical containing from 5 to 12 carbon atoms and the cyclic moiety of which may contain one or more carbon-carbon double bonds and be substituted by one or more of the above substituents; a concatenation of a plurality of the aforesaid radicals; with the proviso that said aliphatic radicals defined above may contain one or more bridging —O— oxygen atoms, or —S— sulfur atoms, or —CO— carbonyl groups, or —COO— carboxylate groups; and R$_2$ is a hydrogen atom.

7. The composition of matter as defined by claim 6, said lanthanide or yttrium-based compound comprising (1) a lanthanide or yttrium salt of (i) an aliphatic monocarboxylic acid containing from 6 to 24 carbon atoms, saturated or containing an ethylenic double bond, or a substituted such acid substituted one or more chlorine atoms, hydroxy groups, alkoxy groups containing from 1 to 6 carbon atoms, phenyl, phenoxy or cyclohexyl groups, the cyclic moieties of which optionally being substituted by one or more chlorine atoms, hydroxy groups, or alkyl or alkoxy groups containing 1 to 6 carbon atoms; (ii) a mercaptomonocarboxylic acid containing from 2 to 6 carbon atoms or a mercaptodicarboxylic acid containing from 3 to 6 carbon atoms; (iii) benzoic or cyclohexanecarboxylic acid, the cyclic moiety of which optionally being substituted by one or more chlorine atoms, hydroxy groups, alkyl or alkoxy groups containing 1 to 6 carbon atoms, or alkoxycarbonyl groups containing 2 to 12 carbon atoms; or (iv) an alkyl monoester, the alkyl moiety containing 1 to 12 carbon atoms, or an aliphatic dicarboxylic acid containing 4 to 24 carbon atoms, saturated or containing an ethylenic double bond, or a substituted such monoester substituted by one or more chlorine atoms, hydroxy groups, mercapto groups or alkoxy groups containing 1 to 6 carbon atoms; or (2) a lanthanide or yttrium phenolate, the phenolic moiety of which optionally being substituted by one or more chlorine atoms, alkyl or alkoxy groups containing 1 to 12 carbon atoms, or phenyl, benzyl, phenoxy or cyclohexyl groups.

8. The composition of matter as defined by claim 1, said lanthanide or yttrium-based compound comprising a lanthanide or yttrium oxide, hydroxide, or salt of an inorganic oxygen acid.

9. The composition of matter as defined by claim 8, wherein the lanthanide or yttrium salt of an inorganic oxygen acid comprises the sulfite, sulfate, sulfonate, nitrite, nitrate, phosphite, phosphate, pyrophosphate, carbonate, perchlorate, antimonate, arsenate, selenite, selenate, vanadate or tungstate.

10. The composition of matter as defined by claim 1, said at least one ammonium, or alkali or alkaline earth metal halide comprising ammonium, sodium, potassium, magnesium, calcium, strontium or barium, chloride, bromide or iodide.

11. The composition of matter as defined by claim 1, said lanthanide-based compound comprising at least one lanthanum (III) stearate, lanthanum (III) oxide, cerium (III) stearate, and cerium (IV) oxide, and said at least one ammonium, or alkali or alkaline earth metal halide comprising ammonium, sodium, or potassium chloride, bromide or iodide.

12. The composition of matter as defined by claim 1, the amount of said lanthanide or yttrium-based compound providing from $0.1 \times 10^{-4}$ to $10 \times 10^{-4}$ gram-atoms of lanthanide group or yttrium metal per 100 g of polyamide; and the amount of ammonium, or alkali or alkaline earth metal halide being such that the ratio:

$$\frac{\text{total number of gram-atoms of halogen}}{\text{number of gram-atoms of lanthanide group or yttrium metal}}$$

ranges from 1 to 20.

13. The composition of matter as defined by claim 1, said polyamide matrix comprising a polyamide prepared by polycondensation of a saturated aliphatic dicarboxylic acid containing from 6 to 12 carbon atoms with a saturated aliphatic diprimary diamine containing from 6 to 12 carbon atoms, a polyaminoacid prepared by direct homopolycondensation of an ω-aminoalkanoic acid having a hydrocarbon chain containing from 4 to 12 carbon atoms, or by hydrolytic ring opening and polymerization of the lactams of such acid, a copolyamide prepared from the aforesaid monomers, or admixture thereof.

14. A shaped article comprising the composition of matter as defined by claim 1.

15. A stabilizer composition comprising at least one lanthanide or yttrium based compound comprising (1) a lanthanide or yttrium salt of (i) an aliphatic monocarboxylic acid containing from 2 to 30 carbon atoms or an aliphatic dicarboxylic acid containing from 3 to 30 carbon atoms, either saturated or containing one or more ethylenic double bonds, or a substituted such acid substituted by one or more halogen atoms, hydroxy groups, alkoxy groups containing from 1 to 12 carbon atoms, mercapto groups, phenyl, phenoxy, naphthyl, or cyclohexyl groups, the ring moieties of which optionally being substituted by one or more halogen atoms, hydroxy groups, alkyl groups containing 1 to 6 carbon atoms, or alkoxy groups containing 1 to 6 carbon atoms; (ii) benzoic, 1-naphthoic, 2-naphthoic, cyclopentanecarboxylic, cyclohexanecarboxylic, cyclopentenecarboxylic or cyclohexenecarboxylic acid, the cyclic moieties of which optionally being substituted by one or more halogen atoms, hydroxy groups, alkyl groups containing 1 to 12 carbon atoms, alkenyl groups containing 2 to 12 carbon atoms, alkoxy groups containing 1 to 12 carbon atoms, phenyl, benzyl, phenoxy or cyclohexyl groups, alkoxy-carbonyl groups containing 2 to 24 carbon atoms, or alkenyloxy-carbonyl groups containing 4 to 24 carbon atoms; (iii) an alkylmonoester, the alkyl moiety of which containing 1 to 24 carbon atoms, or alkenyl monoester, the alkenyl moiety of which containing 3 to 24 carbon atoms, of the aliphatic dicarboxylic acids defined above; (iv) a heterocyclic carboxylic acid, or a substituted such acid substituted by one or more halogen atoms, hydroxy groups, alkyl groups containing 1 to 12 carbon atoms, alkoxy groups containing 1 to 12 carbon atoms, alkenyl groups containing 2 to 12 carbon atoms, alkoxycarboxyl groups containing 2 to 24 carbon atoms, or alkenyloxycarbonyl groups containing 4 to 24 carbon atoms; (2) a lanthanide or yttrium phenolate, the cyclic moiety of which optionally being substituted by one or more halogen atoms, alkyl or alkoxy groups containing 1 to 24 carbon atoms, alkenyl groups containing 2 to 24 carbon atoms, phenyl, benzyl, phenoxy or cyclohexyl groups; (3) a lanthanide or yttrium mercaptide; (4) a lanthanide or yttrium chelate of a β-dicarbonyl compound having the general formula (I):

$$R_1\text{—CO—CHR}_2\text{—CO—}R_3 \qquad (I)$$

in which $R_1$ and $R_3$, which are identical or different, are each a straight or branched chain alkyl group containing 1 to 36 carbon atoms, or such alkyl group substituted by one or more halogen atoms; a straight or branched chain alkenyl group containing 3 to 36 carbon atoms, or such alkenyl group substituted by one or more halogen atoms; an aryl radical or an aryl radical substituted aromatically by one or more of the following substituents: (a) alkyl radicals containing 1 to 6 carbon atoms, or such radicals substituted by one or more halogen atoms, (b) alkenyl radicals containing 2 to 6 carbon atoms, or such radicals substituted by one or more halogen atoms, (c) the nitro group, (d) the —CHO group (e) the —COOH group (f) alkoxy groups containing 1 to 6 carbon atoms, (g) a —COOR$_4$ group, wherein $R_4$ is an alkyl radical containing 1 to 12 carbon atoms or an alkenyl radical containing 2 to 12 carbon atoms, (h) the OH group, or (i) halogen atoms; an aralkyl radical, the aliphatic moiety of which contains from 1 to 12 carbon atoms and the cyclic moiety of which may be substituted by one or more of the above substituents; a cycloaliphatic radical containing from 5 to 12 carbon atoms and the cyclic moiety of which may contain one or more carbon-carbon double bonds and be substituted by one or more of the above substituents; a concatenation of a plurality of the aforesaid radicals; with the proviso that said aliphatic radicals defined above may contain one or more bridging —O— oxygen atoms, or —S— sulfur atoms, or —CO— carbonyl groups, or —COO— carboxylate groups; and $R_2$ is a hydrogen atom; or (5) a lanthanide or yttrium oxide, hydroxide, or salt of an inorganic oxygen acid.

16. A composition of matter comprising a polyamide matrix, said matrix having incorporated therein a stabilizing amount of at least one lanthanide or yttrium-based compound and at least one ammonium, or alkali or alkaline earth metal halide, said lanthanide or yttrium-based compound comprising (1) a lanthanide or yttrium phenolate, the cyclic moiety of which optionally being substituted by one or more halogen atoms, alkyl or alkoxy groups containing 1 to 24 carbon atoms, alkenyl groups containing 2 to 24 carbon atoms, phenyl, benzyl, phenoxy or cyclohexyl groups; (2) a lanthanide or yttrium mercaptide; or (3) a lanthanide or yttrium chelate of a β-dicarbonyl compound having the general formula (I):

$$R_1\text{—CO—CHR}_2\text{—CO—}R_3 \qquad (I)$$

in which $R_1$ and $R_3$, which are identical or different, are each a straight or branched chain alkyl group containing 1 to 36 carbon atoms, or such alkyl group substituted by one or more halogen atoms; a straight or branched chain alkenyl group containing 3 to 36 carbon atoms, or such alkenyl group substituted by one or more halogen atoms; an aryl radical or an aryl radical substituted aromatically by one or more of the following substituents: (a) alkyl radicals containing 1 to 6 carbon atoms, or such radicals substituted by one or more halogen atoms, (b) alkenyl radicals containing 2 to 6 carbon atoms, or such radicals substituted by one or more halogen atoms, (c) the nitro group, (d) the —CHO group, (e) the —COOH group, (f) alkoxy groups containing 1 to 6 carbon atoms, (g) a —COOR$_4$ group, wherein $R_4$ is an alkyl radical containing 1 to 12 carbon atoms or an alkenyl radical containing 2 to 12 carbon atoms, (h) the OH group, or (i) halogen atoms; an aralkyl radical, the aliphatic moiety of which contains from 1 to 12 carbon atoms and the cyclic moiety of which may be substituted by one or more of the above substituents; a cycloaliphatic radical containing from 5 to 12 carbon atoms and the cyclic moiety of which may contain one or more carbon-carbon double bonds and be substituted by one or more of the above substituents; a concatenation of a plurality of the aforesaid radicals; with the proviso that said aliphatic radicals defined above may contain one or more bridging —O— oxygen atoms, or —S— sulfur atoms, or —CO— carbonyl groups, or —COO— carboxylate groups; and $R_2$ is a hydrogen atom.

17. The composition of matter as defined by claim 1, said lanthanide or yttrium-based compound comprising a lanthanide or yttrium hydroxide or salt of an inorganic oxygen acid.

* * * * *